United States Patent [19]

Takaoka

[11] Patent Number: 5,333,987
[45] Date of Patent: Aug. 2, 1994

[54] AUTOMATED HIGH-RAISED PARKING SYSTEM

[75] Inventor: Shigekazu Takaoka, Kasugai, Japan

[73] Assignee: Daifuku Co., Ltd., Osaka, Japan

[21] Appl. No.: 968,823

[22] Filed: Oct. 30, 1992

[30] Foreign Application Priority Data

| Nov. 5, 1991 | [JP] | Japan | 3-288199 |
| Nov. 5, 1991 | [JP] | Japan | 3-288200 |
| Nov. 19, 1991 | [JP] | Japan | 3-303027 |

[51] Int. Cl.⁵ ............................ E04H 6/22
[52] U.S. Cl. .................... 414/264; 414/255; 414/260; 414/259; 414/261; 414/246; 414/253; 52/143; 187/1 R
[58] Field of Search ........... 414/227, 231, 232, 234, 414/240, 241, 242, 243, 245, 246, 252, 253, 255, 256, 257, 258, 260, 261, 264; 187/1 R; 52/143

[56] References Cited

U.S. PATENT DOCUMENTS

| 1,554,584 | 9/1925 | Lake | 414/246 |
| 1,757,331 | 5/1930 | Porter | 414/264 |
| 2,223,962 | 12/1940 | Mitchell | 414/260 X |
| 2,285,232 | 6/1942 | Sheehan | 414/264 |
| 4,664,580 | 5/1987 | Matoba | 414/264 X |
| 4,869,634 | 9/1989 | Carter | 414/264 X |
| 4,936,730 | 6/1990 | Morioka | 414/264 X |
| 4,976,581 | 12/1990 | Wu | 414/264 X |
| 5,018,926 | 5/1991 | Sternad | 414/255 X |

FOREIGN PATENT DOCUMENTS

| 194563 | 1/1958 | Austria | 414/264 |
| 407973 | 1/1991 | European Pat. Off. | 414/261 |
| 1434545 | 11/1968 | Fed. Rep. of Germany | 414/261 |
| 62-284864 | 12/1987 | Japan . | |
| 35173 | 2/1990 | Japan | 414/260 |
| WO9005820 | 5/1990 | PCT Int'l Appl. . | |
| 403275 | 6/1966 | Switzerland | 414/259 |
| 227257 | 1/1925 | United Kingdom . | |
| 337726 | 10/1930 | United Kingdom . | |
| 771399 | 4/1957 | United Kingdom . | |
| 1034411 | 6/1966 | United Kingdom . | |
| 1075793 | 7/1967 | United Kingdom . | |
| 1321635 | 6/1973 | United Kingdom . | |
| 1502921 | 3/1978 | United Kingdom . | |

Primary Examiner—Frank E. Werner
Attorney, Agent, or Firm—Webb Ziesenheim Bruening Logsdon Orkin & Hanson

[57] ABSTRACT

An automated high-raised parking system includes a parking rack structure having a plurality of racks disposed one above another for parking an automobile, an entrance/exit section for allowing entrance and exit of the automobile and a lift-translator device for transporting the automobile between the entrance/exit section to the racks. The lift-translator device includes a lift table vertically movable along a lift passage extending along a side of the parking rack structure and communicating with the entrance/exit section. In this system, the invention provides a shielding member for shielding an upward view from the entrance/exit section up through the lift passage when the lift table is positioned at the entrance/exit section for entrance or exit of the automobile.

17 Claims, 11 Drawing Sheets

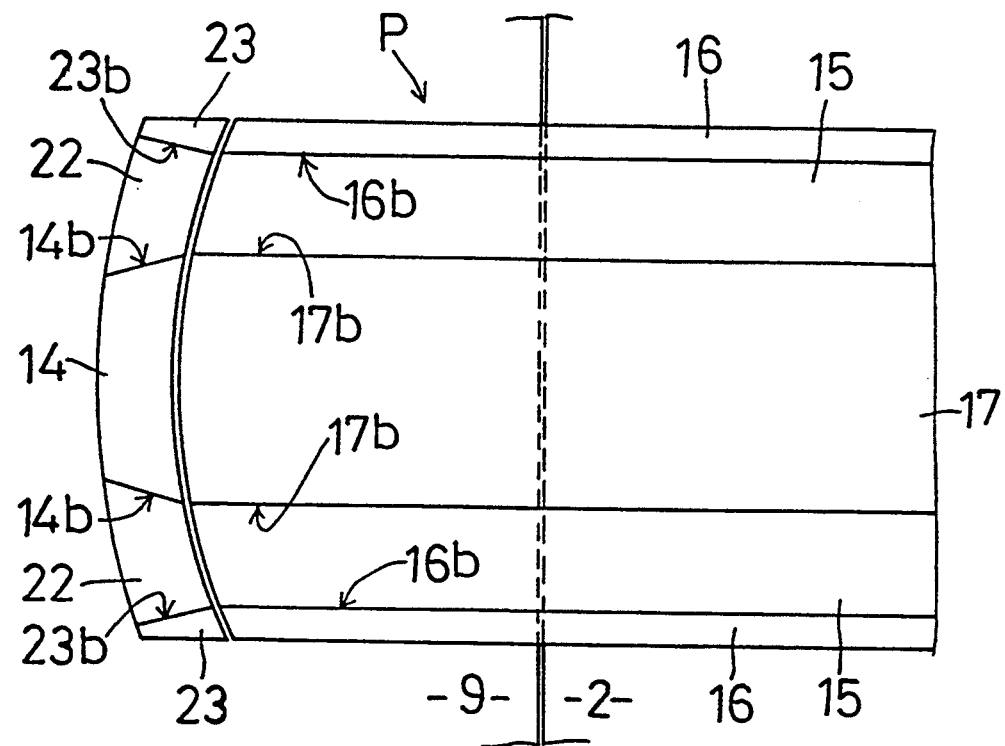
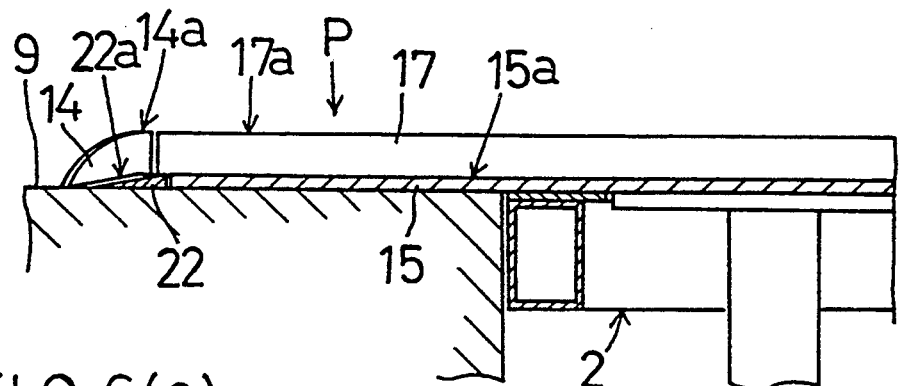
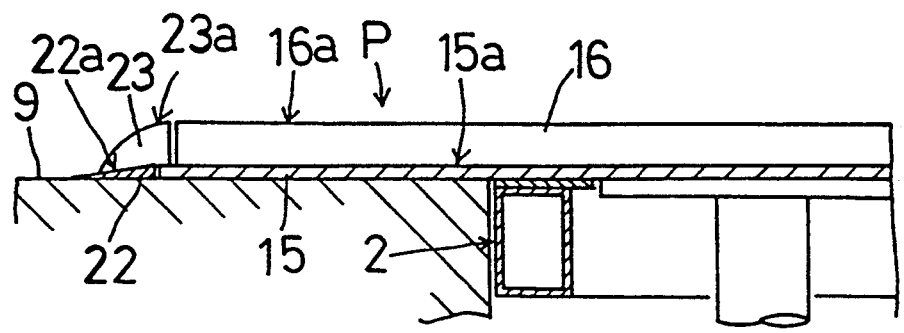

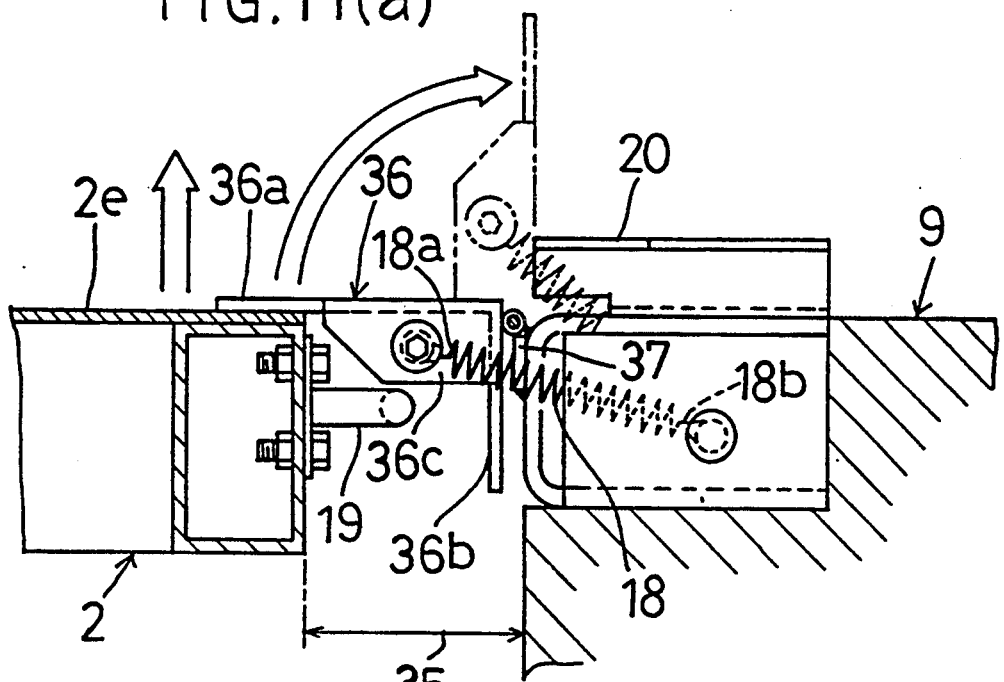
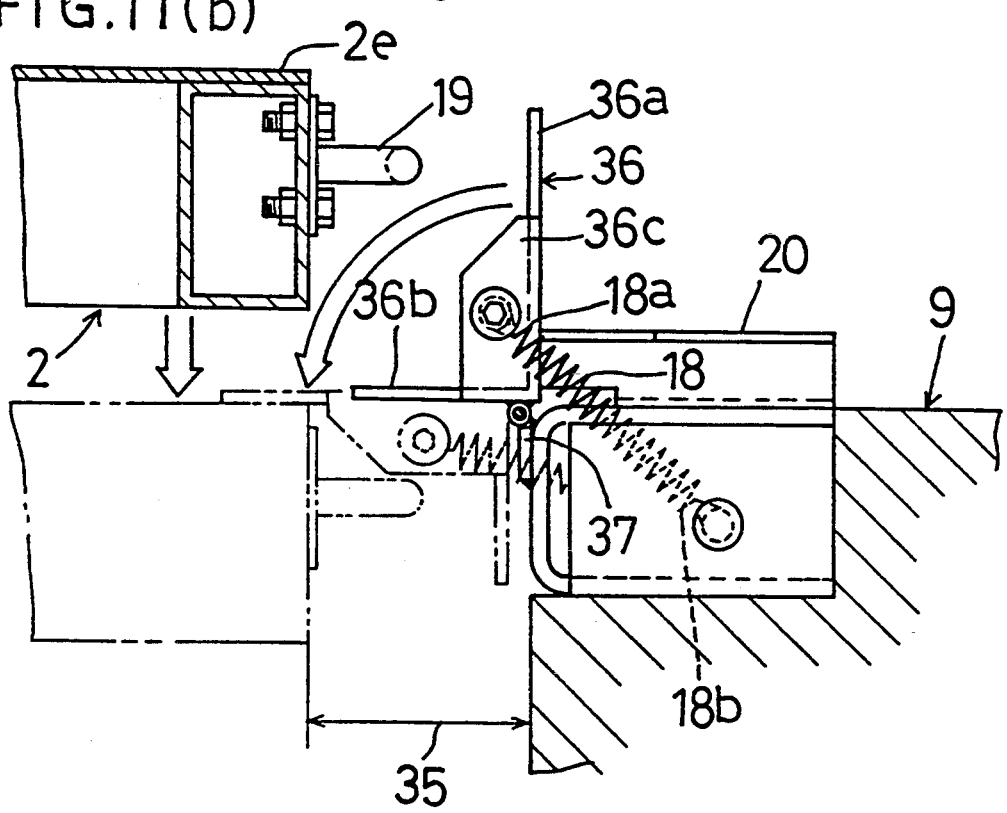

AUTOMATED HIGH-RAISED PARKING SYSTEM

This application relates to copending U.S. patent application Ser. No. 07/960,116, filed on Oct. 13, 1992.

BACKGROUND OF THE INVENTION

1. Field of the Invention

The present invention relates to an automated high-raised parking system, and more particularly to the parking system including a parking rack structure having a plurality of stories of parking racks for automobiles and disposed inside a construction and extending upwardly from an entrance/exit section for allowing entrance and exist of the automobiles to and from the construction, the system further including a lift passage formed along a free side of the rack structure and communicated with the entrance/exit section for transporting the automobile between the entrance/exit section and the parking racks, and a lift-translator device having a lift table for lifting the automobile up to the racks.

2. Description of the Related Art

In the conventional automated high-raised parking system of the above-described type, the entrance/exit is merely opened to the lift passage (e.g. Japanese laid-open patent gazette No. 62-284864).

According to this convention, however, as the driver drives the automobile into the entrance-exit section in order to park it into the construction or walks into the section in order to withdraw the automobile from the construction and looks upwards inside the construction, the high-raised rack structure on which often times many automobiles are parked presents the driver with a rather intimidating view.

A primary object of the present invention is to overcome the above problem of the convention by providing an automated high-raised parking system which the driver can use in a comfortable manner without providing the driver with such intimidating feel and yet which achieves this object without sacrificing the other convenient features of the system.

SUMMARY OF THE INVENTION

For accomplishing the above-noted object, an automated high-raised parking system, according to the present invention, includes shielding means for shielding from a driver an upward view from the entrance/exit section through the lift passage.

According to this construction, as the shielding means prevents the upward view from the entrance/exit section through the lift passage, the construction does not allow the driver to see, through the lift passage, the high-raised parking rack structure with many parked automobiles.

With the prevention of the upward view, the driver entering the entrance/exit section can use the system comfortably without feeling intimidated by the view of the high-raised construction.

According to one preferred embodiment of the present invention, the shielding means is constructed as a shielding member liftable with the lift table.

In the case of this construction too, the same effect as described above can be achieved. That is, when lift table is positioned at the entrance-exit section, the shielding member prevents the view from this section upwards to the high-raised parking structure. The parking system of this construction too provide the driver with comfort without necessitating any changes in the constructions of the lift passage and the entrance/exit section.

According to a further embodiment of the invention, the shielding means includes a shielding member capable of selectably providing a closed state to prevent the upward view and an opened state to allow passage of the lift table and an opening-closure control means for selectively opening or closing the shielding member in accordance with a lifting movement of the lift table.

In the case of this construction again, the shielding member provided at the entrance/exit section and selectively providing the closed state and the opened state prevents the upward view, thus achieving the same effect as the above-described constructions. And, this construction has an additional advantage of achieving this effect without adding to the weight of the lift table.

According to a still further embodiment of the present invention, the parking rack structure includes a plurality of receiver frames arranged one above another for receiving ends of a pallet for mounting an automobile; and an auxiliary shielding member is attached to one of the parking racks positioned immediately above the entrance/exit section so as to shield the upward view from the entrance/exit section to the parking rack structure.

With the above construction, in the case an automobile is parked on the pallet and the rack structure includes a plurality of receiver frames, even when no pallet is present on the parking rack immediately above the entrance/exit section, the auxiliary shielding member prevents the upward view from the entrance /exit section to the parking rack structure, such that the driver who have entered the entrance/exit section for entrance or exit of his/her automobile does not feel intimidated by the upward view from the section.

According to a further feature of the present invention, the pallet is constructed so as to be disposed and supported on a floor face of the entrance/exit section and on the floor face there is provided a tire guide member extending continuously with a tire passage of the pallet mounted and supported on the floor face.

Further, an end of an upper face of the tire guide member which end is positioned adjacent the pallet has a height substantially the same as that of an upper face of the tire passage, and the end of the upper face of the tire guide member is provided with such an inclination that the end gradually approaches the floor face as extending away from the pallet.

With the above feature, even if a gap is formed between the floor face and the upper face of the tire passage, the automobile may be smoothly moved onto the pallet through the inclined upper face of the tire guide member. It is conceivable to form such an inclined guide face in the terminal end of the pallet to achieve the same effect. This is disadvantageous, however, since the arrangement results in cost increase and construction complexity in the pallet which is to be made by a significant number of units.

Accordingly, since the automobile may be moved onto the pallet even if there is formed a gap between the floor face of the upper face of the tire passage, the floor face can be formed evenly flat including its portion on which the pallet is placed. Further, this feature achieves this effect without entailing cost increase and complication of the construction of the significant number of pallets. As a result, it is possible to reduce the manufacturing costs of the entire parking system.

According to a still further feature of the present invention, the pallet includes, at opposed lateral sides thereof, a pair of outer derailment-prevention guides projecting upwards relative to the tire passage, while the floor face includes a pair of outer derailment-prevention members extending continuously with the outer derailment-prevention guides of the pallet as this pallet is placed on the floor face.

Further, an end of an upper face of each outer derailment-prevention member which end is positioned adjacent the pallet has a height substantially same as that of the upper face of the tire passage, and the end of the upper face of the outer derailment-prevention member is provided with such an inclination that the end gradually approaches the floor face as extending away from the pallet.

With the above feature, it is possible to prevent derailment of the tires of the automobile off the tire guide member as the automobile moves through the tire guide member onto the pallet. Further, as the tires are guided to the tire passage on the pallet, the automobile can be properly positioned on the pallet. Moreover, since the upper face of the derailment-prevention member has the inclination, it is possible to avoid such danger that the walking driver trips on the pallet. In these manners, the construction with the above feature can prevent derailment of the tires off the pallet and can also provide safety for the driver who walks on the pallet.

According to a still further feature of the present invention, a side face of the outer derailment-prevention member opposing to the tire guide member has its end adjacent the pallet formed at a substantially same position as an inner side face of the outer derailment-prevention guide with respect to a width direction of the pallet and said side face of the outer derailment-prevention member is formed so as to extend outwards relative to the pallet width direction as departing from the pallet.

With the above feature, it is possible to outwardly extend the passage for properly guiding the automobile to the pallet with respect to the pallet width direction, such that the guide operation of the automobile onto and off the pallet can be effected in an easy and safe manner.

According to a still further feature of the present invention, the pallet includes, at an inner position of the tire passage thereof, an inner derailment-prevention guide projecting upwards relative to the tire passage, while the floor face includes an inner derailment-prevention member extending continuously with the inner derailment-prevention guide of the pallet as being placed on the floor face.

Further, an end of an upper face of the inner derailment-prevention member which end is positioned adjacent the pallet has a height substantially the same as that of an upper face of the inner derailment-prevention guide, and the end of the upper face of the inner derailment-prevention member is provided with such an inclination that the end gradually approaches the floor face as extending away from the pallet.

With the above feature, the same distinguished effect as described above can be achieved with respect to both the right and left tires of the automobile and this construction can further reliably prevent derailment of these right and left tires.

According to a still further feature of the present invention, a side face of the inner derailment-prevention member opposing to the tire guide member has its end adjacent the pallet formed at a substantially same position as an outer side face of the inner derailment-prevention guide with respect to the width direction of the pallet and said side face of the inner derailment-prevention member is formed so as to extend inwards relative to the pallet width direction as departing from the pallet.

With the above feature, the same distinguished effect as described above can be achieved in the case also of the construction where the inner derailment-prevention guide projecting upwards relative to the tire passage is provided inwardly of the tire passage.

According to a still further feature of the present invention, a connection member is provided for continuously connecting the floor face and a walk-on surface.

Further, the connection member is capable of selectively providing a closed state for connecting the floor face and the walk-on surface and an opened state where the connection member is receded towards either the floor face side or the walk-on surface side.

With the above feature, when the lift unit is lifted, the connection member is switched to the opened state, such that a clearance is maintained between the floor face of the entrance/exit section and the lift unit. On the other hand, when the lift unit is located at the entrance/exit section and the floor face of the entrance/exit section and the walk-on surface of the lift unit are positioned substantially on the same height to form a passage, the connection member is switched to the closed state to connect the floor face and the walk-on surface.

As a result, when the floor face of the entrance/exit section and the walk-on surface of the lift unit are positioned substantially on the same height to form a passage, the connection member is switched to the closed state to connect the floor face and the walk-on surface, so that it is possible to prevent a gap from being formed in the surface of the passage. Consequently, with this feature too, the invention can provide a safe and easy-to-use automated high-raised parking system.

Furthermore, it is conceivable to arrange that the connection member is automatically switched to the closed state when the lift unit is lowered into the entrance/exit section and that the connection member is automatically switched to the open state when the lift unit is moved outwards from the entrance/exit section.

The above feature is very convenient since the connection member is switched over between the open state and the closed state in association with the upward or downward movement of the lift unit.

Specifically, the construction of this feature is more convenient and simple than a construction provided with e.g. a special means for controlling the opening/closing operation of the connection member based on information concerning a lifting movement of the lift section.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which become within the meaning and range of equivalency of the claims are therefore intended to be embraced therein.

DESCRIPTION OF THE PREFERRED EMBODIMENTS

Preferred embodiments of an automated high-raised parking system relating to the present invention will now be described in details with reference to the accompanying drawings.

Figure 1:
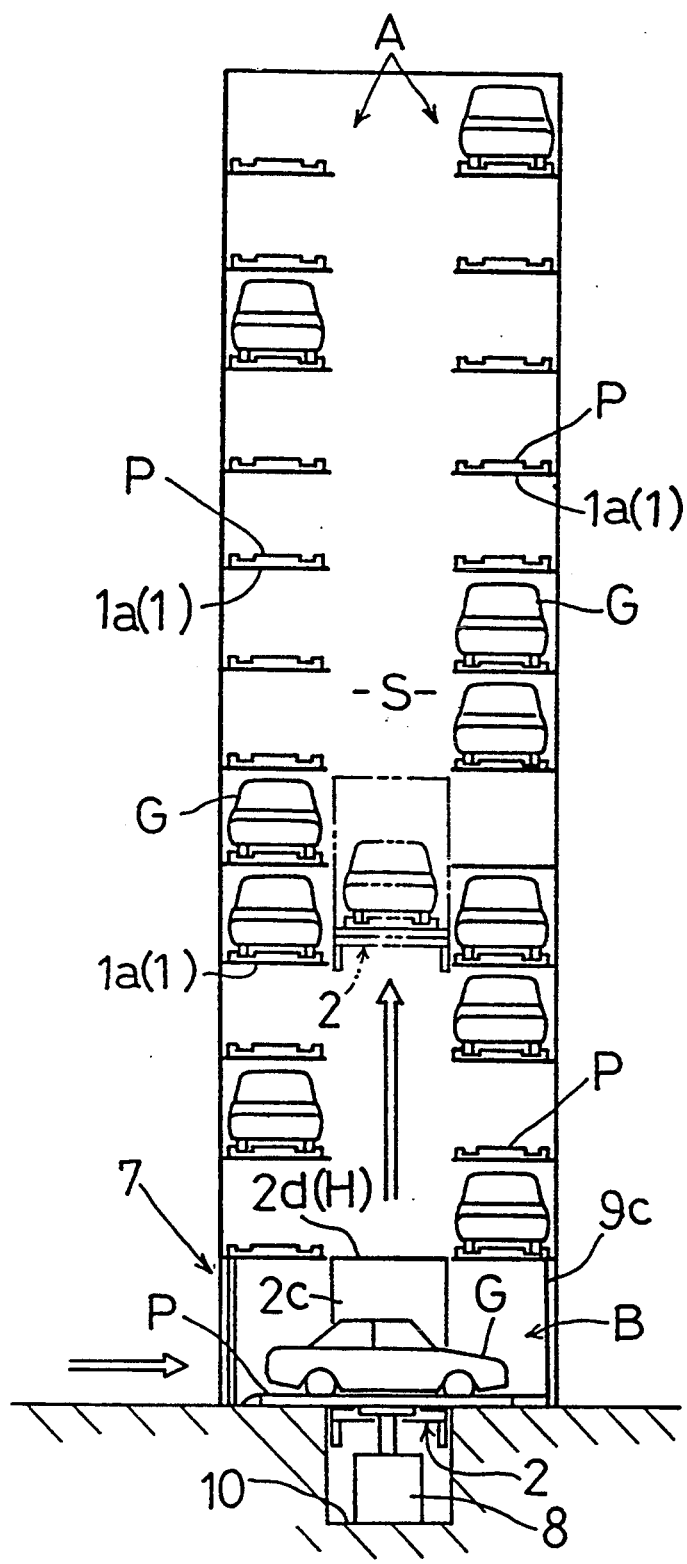
FIG. 1 is a side view showing an entire construction of an automated high-raised parking system relating to the present invention.

FIG. 1 shows an automated high-raised parking system of a first embodiment of the invention. This system includes a parking rack structure A, an entrance/exit section B for entrance and exit of an automobile G, and a lift-translator device C (see FIG. 3) having a lift table 2 for lifting the automobile along a lift passage S.

The parking rack structure A includes a plurality of parking racks 1 disposed above the entrance/exit section B and provided by a pair at opposed sides across the lift passage S, with the rack pair 1 being disposed one above another.

The lift passage S is formed along the sides of the aligned racks and communicated with the entrance/exit section B, so that the lift passage is moved vertically along the passage between a stop position at the entrance/exit section B and a position of any one of the racks 1.

The rack 1 includes a pair of receiver frames 1a, 1a disposed side by side to receive and support opposed longitudinal ends of a pallet P for an automobile mounting pallet P.

Figure 3:
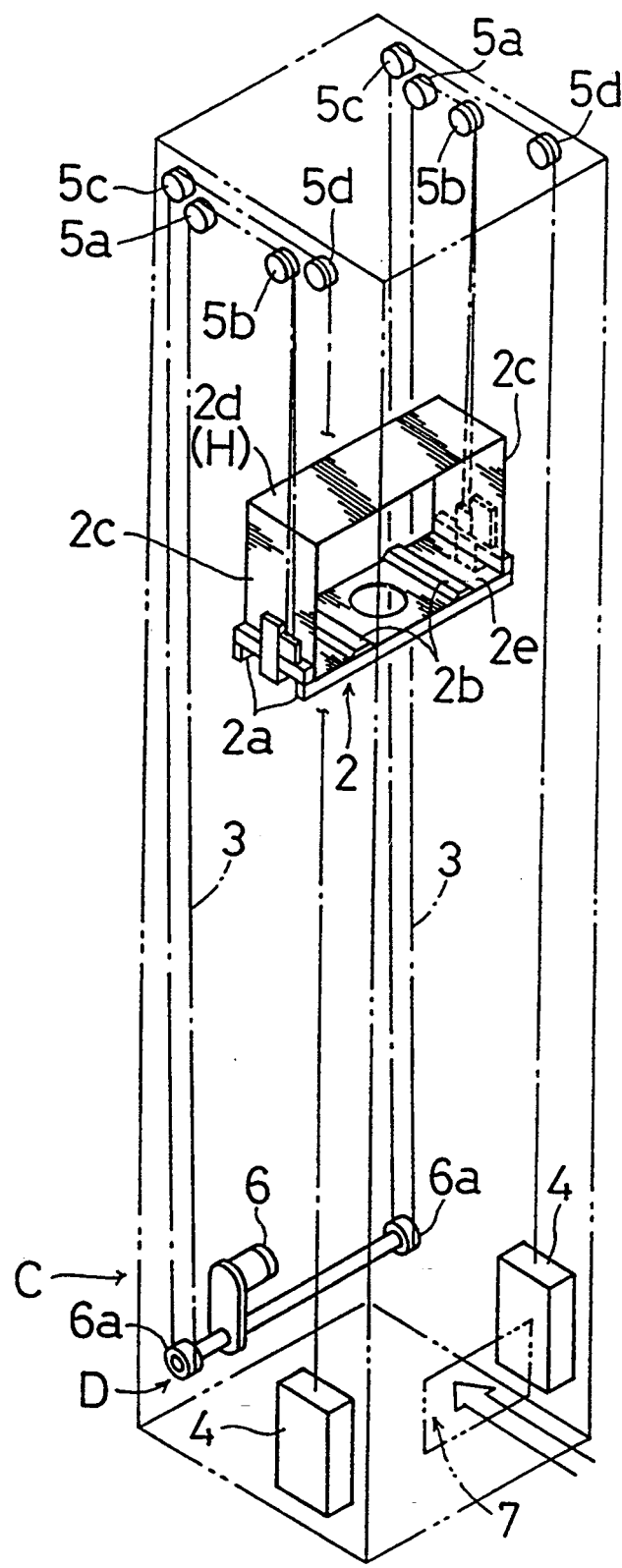
FIG. 3 is a perspective view showing a lift-translator device of the automated high-raised parking system.

The lift-translator device C, as shown in FIG. 3, includes the lift table 2 for mounting the pallet P and a lift drive mechanism D for lifting this lift table 2 up and down.

The lift drive mechanism D includes two cable members 3, 3 to which the lift table 2 and balance weights 4, 4 are connected, with the cable members 3, 3 being reeved around suspension pulleys 5a, 5b, 5c and 5d and drive pulleys 3, 3 of a drive unit 6.

Accordingly, the lift table 2 as being supported and suspended by the cable members 3, 3 and lifted up and down by activation of the drive unit 6.

The lift table 2 includes a frame 2a, a pair of expandable forks 2b for holding the pallet P and translating this pallet to one of the racks 1, side plates 2c vertically extending from opposed longitudinal ends of the frame 2a, a shielding member 2d attached, like a roof, to upper positions of the side plates 2c and acting as a shielding means H for preventing an upward view from the entrance/exit section B through the lift passage S when the lift table 2 is positioned at the entrance/exit section B and a floor plate 2e.

The side plates 2c, 2c and the shielding member 2d are formed of plate-like members. The shielding member 2d, as illustrated in FIG. 2, is attached to the lift table 2 such that this shielding member 2d is positioned at a same height as auxiliary shielding members 11, 11 (to be detailed later) disposed on a lower face of a rack 1' positioned immediately above the entrance/exit section B when the lift table 2 is located at this entrance/exit section B.

Figure 2:
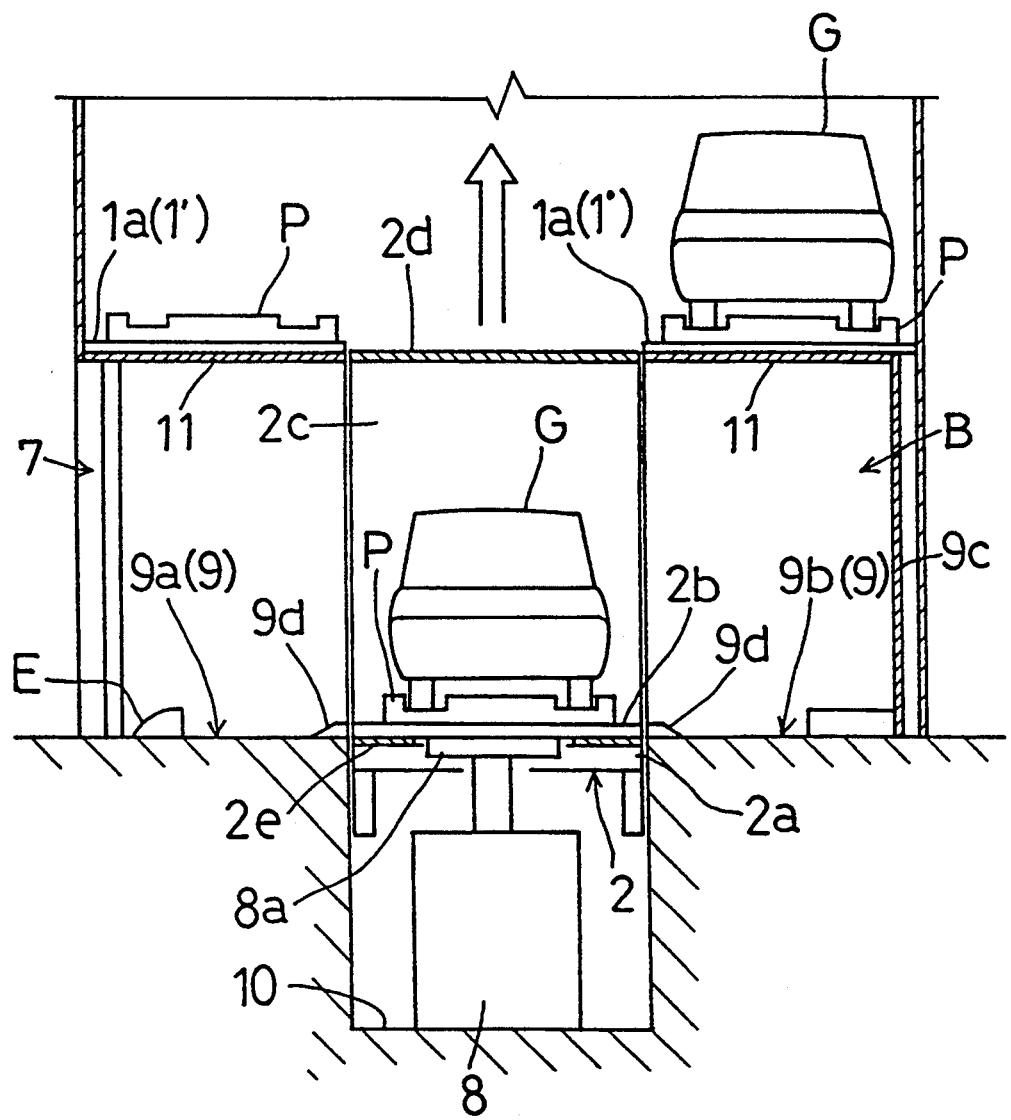
FIG. 2 is a side view showing an entrance/exit section of the automated high-raised parking system.

As also shown in FIG. 2, the entrance/exit section B is provided on the ground floor level below the parking rack structure A; and this section B includes an entrance-exit opening 7 for the automobile G, a turntable device 8 having a swivellable and elevatable turntable 8a, a floor face 9, pallet-mounting portions 9a, 9b for supporting opposed longitudinal ends of the pallet P, a pit 10 which accommodates the turntable device 8 and into which the frame 2a can be lowered, and the auxiliary shielding members 11 attached to the lower face of the rack 1' located immediately above this entrance/exit section B. Incidentally, the pallet-mounting portions 9a, 9b are formed by portions of the floor face 9.

Each auxiliary shielding member 11 is formed of a plate-like member and functions to prevent the upward view from the entrance/exit section B through the parking rack structure A. As described hereinbefore, the auxiliary shielding members 11, 11 and the shielding member 2d are so disposed as to be located at the same height when the lift table 2 is positioned at the entrance/exit section B. Accordingly, the shielding member 2d and the auxiliary shielding members 11, 11 form a single flat ceiling extending above the entrance/exit section B.

Figure 4:
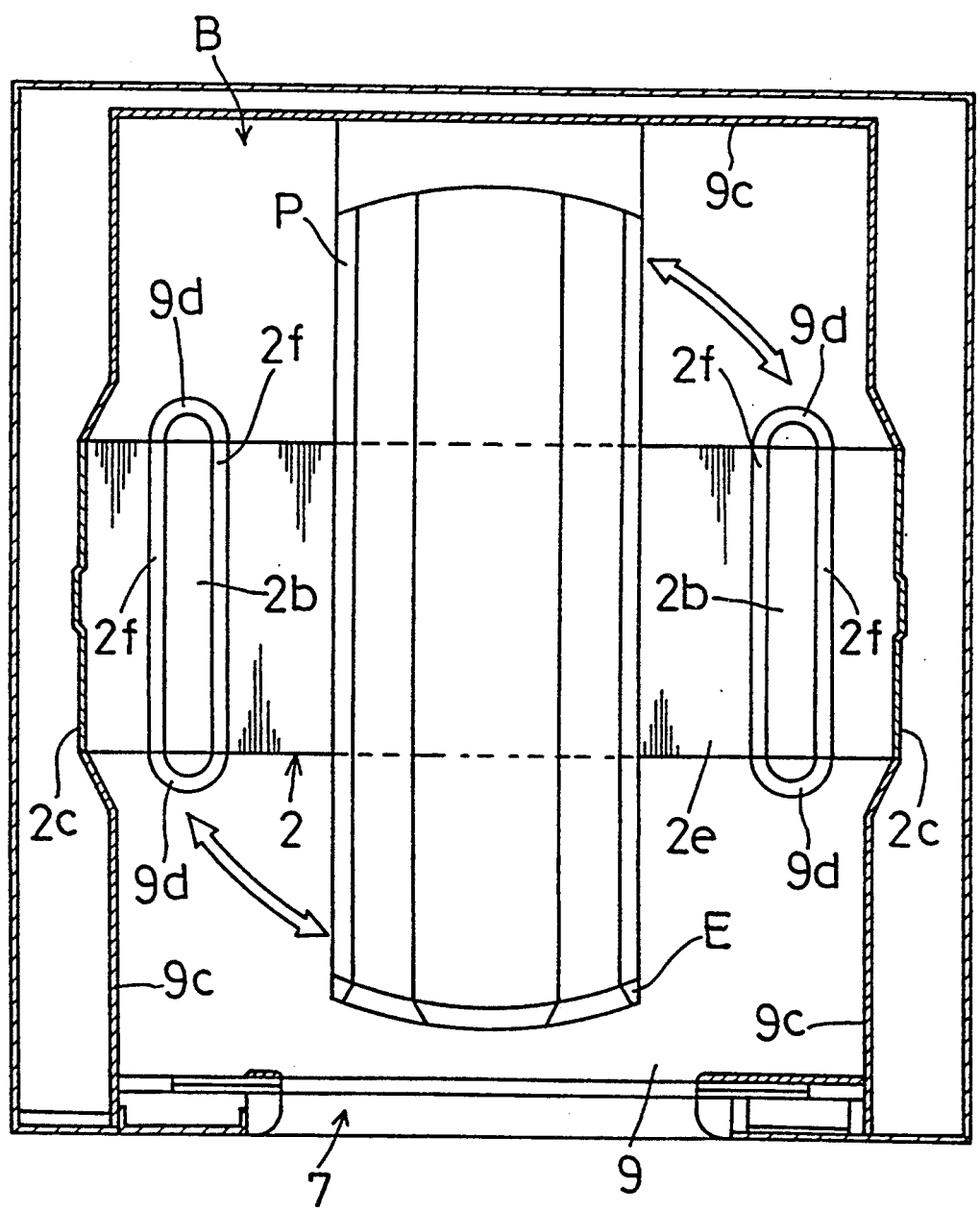
FIG. 4 is a plane view of the entrance/exit section of the parking system.

FIG. 4 shows a condition of the entrance/exit section B made ready for entrance or exit of an automobile.

On an inner face of the entrance-exit section B, there is attached an inner plate 9c which extends continuously with a side plate 2c of the lift table 2. Further, the floor face 9 and the floor plate 2e of the lift table 2 together form a single flat floor face extending throughout the entrance/exit section B.

Incidentally, the upper faces of the expandable forks 2b of the lift table 2 project upwardly relative to the floor face 9 and the floor plate 2e thereby to form a gap. Therefore, in order to prevent the user from tripping over this gap, a tripping-prevention guide 2f and a tripping-prevention member 9d both having an inclined face are provided on the floor plate 2e and the floor face 9, respectively. Also, since a similar gap is formed between the upper face of the pallet P and the floor face 9, a guide member E having an inclined face for guiding an automobile tire is disposed on the floor face.

Next, entrance and exit operations of the above-described automated high-raised parking construction of this embodiment will be described.

As illustrated in FIG. 1, the lift table is located and stopped at the entrance/exit section B.

The pallet P withdrawn from one of the racks 1 is mounted on the pallet mounting portion 9a. Then, the automobile G is driven onto this pallet P.

The driver gets out of the automobile G and walks out of the entrance/exit section B through the entrance-exit opening 7.

Then, with an upward movement of the turntable 8a, the pallet P is lifted above the floor face 9 and then swiveled by 90 degrees and placed onto the upper faces of the expandable forms 2b with an upward movement of the lift table 2.

Then, the lift table 2 is moved further upwards within the lift passage S and stopped beside a predetermined rack 1. Next, the expandable forks 2b are expanded to lower the lift table 2 thereby to place the pallet onto the receiver frames 1a. This completes an entrance operation of the automobile.

In the case of an exit operation of the automobile, the lift table is moved up to the rack 1 where the object automobile is parked and thereafter, the above-described operations are effected in the reverse manner.

In the above-described embodiment, the shielding means H is comprised of the shielding member 2d liftable in unison with the lift table 2. Instead, as shown in FIG. 5, this shielding means can be comprised of a pair of openable/closable shielding members 12 provided at the entrance/exit section B. Specifically, these shielding members 12 are formed of plate-like members and rendered projectable and withdrawable between the lift passage S between the auxiliary shielding members 11 and the receiver frame 1a of the rack 1' positioned immediately above the entrance/exit section B. The projecting movement and withdrawing movement of the members 12 are controlled by an opening/closing control means 13. This opening/closing control means 13 includes a drive motor 13a engaged through an unillustrated rack-pinion connection with the shielding members, and a control unit 13b for controlling the drive of the drive motor 13a based on lifting information of the lift table 2.

Figure 5A:
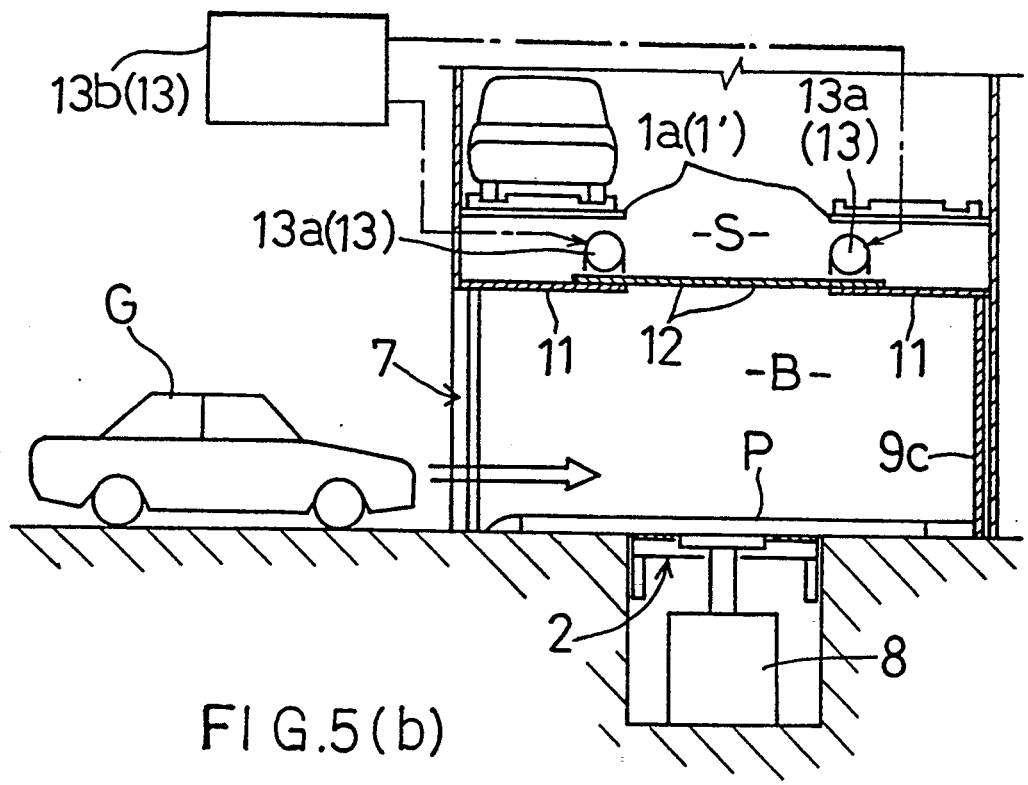
FIG. 5 is a side view showing an entrance/exit section of an automated high-raised parking system relating to a further embodiment of the present invention, FIGS. 6(a), (b) and (c) are views respectively showing a tire guide, an outer derailment-prevention member and an inner derailment-prevention member of the further embodiment of FIG. 5.

As illustrated in FIG. 5(a), when the lift table 2 is located at the entrance/exit section B, the shielding members are projected into the lifting passage S thereby to shield the upward view from the section B into the lift passage S. Accordingly, the shielding members 12 and the auxiliary shielding members 11 together form a substantially single flat ceiling extending over the entire upper side of the entrance/exit section B.

Figure 5B:
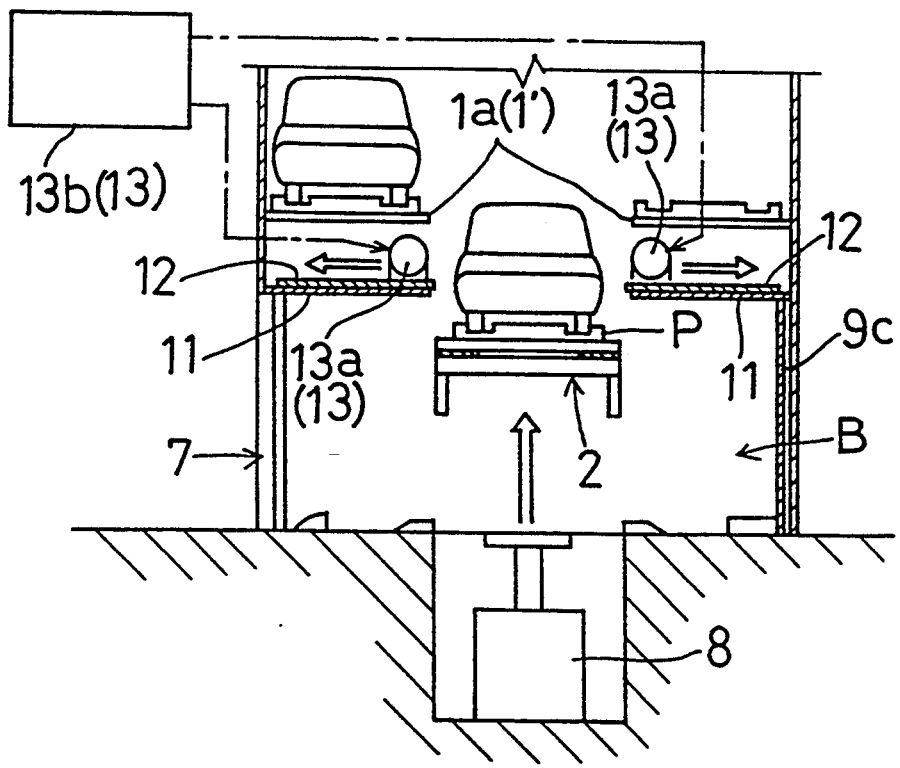

On the other hand, as illustrated in FIG. 5(b), when the lift table 2 is operated for lifting, the shielding members 12 are withdrawn between the auxiliary shielding members 11 and the rack 1', thereby to provide an opening for allowing the lifting movement of the lift table 2.

In the foregoing embodiments, the parking rack structure A is provided only above the entrance-exit section B. It is also conceivable, however, to provide this parking rack structure A both above and under the entrance/exit section B.

It is also conceivable to provide a plurality of the entrance-exit sections B and these sections may be constructed to function solely as an entrance section or an exit section.

Further, the entrance/exit section B may be constructed either on the ground or under the ground.

It is conceivable that an entrance is made on the uppermost floor level and an exit is made on the lowermost floor level and vice versa.

In the foregoing embodiment, the shielding means H is formed of a plate-like member. Instead, it is conceivable to form this means as a blind-like structure which shields the view yet allows ventilation. Especially, if this construction is employed in the shielding member 2d lifted in unison with the lift table 2, it is possible to reduce air resistance that the lift table 2 encounters in the lifting operation, thereby to increase the speed of the lifting operation and also to reduce the drive force necessary for the lifting operation.

Incidentally, in the present invention, the shielding of the view essentially relates to the prevention of the drive from being intimidated by the view. Therefore, it is also conceivable to form the shielding means by a semi-transparent plate member or a mesh member which allows a certain amount of visibility.

Further, in the above embodiment, the pair of shielding members 12 are provided for closing a half section of the lift passages S by one of the members 12. Instead, it is also conceivable for one shielding member 12 to close the entire section of the lift passage S.

A still further embodiment of the present invention will be described next.

At the entrance/exit section B of this embodiment, the floor face 9 includes, at a side of the pallet-mounting portion 9 facing the entrance-exit opening 7, tire guide members 22, 22, outer derailment-prevention members 23, 23 and an inner derailment-prevention member 14.

Whereas, the pallet P includes tire passages 15, 15, outer derailment-prevention guides 16, 16 and inner derailment-prevention guides 17, 17. Further, forward and rear side edges of the pallet P are so formed as to follow a swivel path of this pallet P as swiveled by the turntable device 8.

As best shown in FIGS. 6(a) and (b), the tire guide members 22, 22, the outer derailment-prevention members 23, 23 and the inner derailment-prevention members 14 are formed continuously with the tire passages 15, 15, the outer derailment-prevention guide 16, 16 and the inner derailment-prevention guide 17, respectively.

The pallet mounting portions 9a, 9b are formed by portions of the flat floor face 9.

An end of an upper face 22a of the tire guide member 22 adjacent the pallet P is provided with a same or substantially same height as an upper face 15a of the tire passage 15 and with an inclination such that the upper face 22a approaches the floor face 9 as departing from the pallet P.

As illustrated in FIG. 6(c), an end of an upper face 23a of the outer derailment-prevention member 23 is provided with a same or substantially same height as an upper face 16a of the outer derailment-prevention guide 16 and with an inclination such that the upper face 23a approaches the floor face 9 as departing from the pallet P. Also, a side face 23b of the outer derailment-prevention member 23 opposing of the tire guide member 22 has its end adjacent the pallet P formed at a substantially same position as an inner side face 16b of the outer derailment-prevention guide 16 with respect to a width direction of the pallet P and the side face 23b of the outer derailment-prevention member 23 is formed so as to extend outwards relative to the pallet P width direction as departing from the pallet P.

Also, an end of an upper face 14a of the inner derailment-prevention member 14 which end is positioned adjacent the pallet P has a height substantially same as that of an upper face 17a of the inner derailment-prevention guide 17, and the end of the upper face 14a of the inner derailment-prevention member 14 is provided with such an inclination that the end gradually approaches the floor face 9 as extending away from the pallet P. Further, a side face 14b of the inner derailment-prevention member 14 opposing to the tire guide member 22 has its end adjacent the pallet P formed at a substantially same position as an outer side face 17b of the inner derailment-prevention guide 17 with respect to the width direction of the pallet P and the side face 17b of the inner derailment-prevention member is formed so as to extend inwards relative to the pallet width direction as departing from the pallet P.

Incidentally, the upper face 22a of the tire guide member 22, the upper face 23a and the side face 23b of the outer derailment-prevention member 23 and the upper face 14a and the side face 14b of the inner derailment-prevention member 14 may be formed either as flat faces or curved faces. Also, it is possible to form some unevenness in these faces such as small grooves for water drainage, reinforcing ribs or decorative patters.

On the pallet-mounting portions 9a, 9b, the pallet P may be supported via some rubber intermediate members. In this case, the height difference between the floor face 9 and the pallet P will increase by a corresponding amount. Therefore, the tire guide members 22 will be even more useful.

The tire guide members 22, the outer derailment-prevention members 23 and the inner derailment-prevention member 14 may be employed in a different type of automated high-raised parking system where a concave area is formed in the floor for receiving and supporting the pallet within the concave area or where a pit is dug under the area for placing the pallet thereon and the pallet is supported by means of a support device or support members.

A still further embodiment of the invention will be described next.

Figure 8:
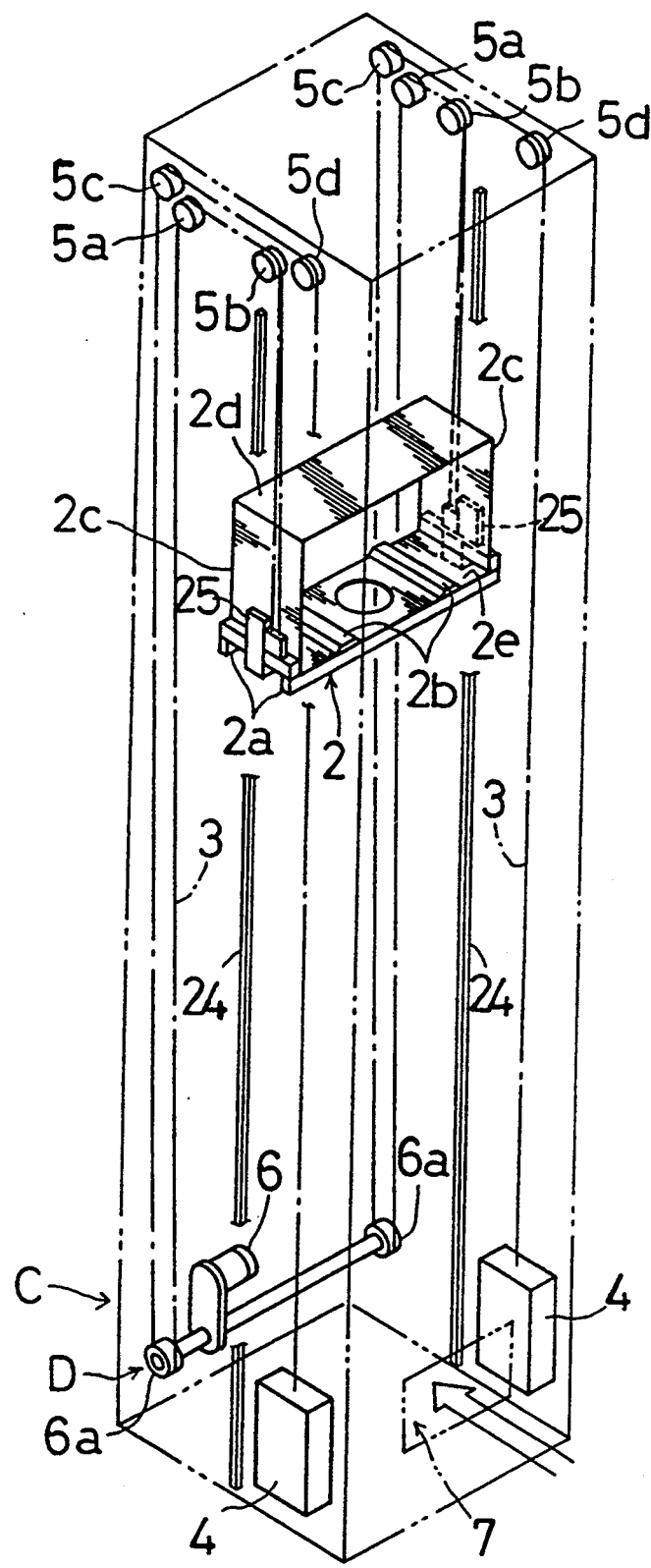
FIG. 8 is a perspective view showing a construction of a lift-translator device of the embodiment of FIG. 7, FIGS. 9(a) and (b) are side views showing a construction of a side frame of a lift unit of the embodiment of FIG. 7.

As illustrated in FIG. 8, to inner sides of side walls of the parking rack structure A facing the width-wise side faces of the lift passage S, there are attached a pair of guide rails 24 for guiding the lifting movement of the lift table along the lift passage S.

The lift-translator device C includes the lift table 2 capable of mounting the pallet P thereon and of being lifted up and down between the entrance/exit section B and one of the racks 1 for transporting the pallet P and the lift drive mechanism D for driving the lift table 2.

The lift table 2 includes the the frame 2a, the pair of expandable forks 2b for holding the pallet P and translating this pallet to one of the racks 1, side fames 25 vertically extending from opposed longitudinal ends of the frame 2a, side plates 2c attached to the central portion of each side frame 25 along this side frame 25, the shielding member 2d attached, like a roof, to upper positions of the side plates 2c and a walk-on face 2e formed at a position of the lift table 2 projecting from the pallet P as oriented for allowing entrance and exit of the driver (this orientation will be more particularly described later).

Figure 9A:
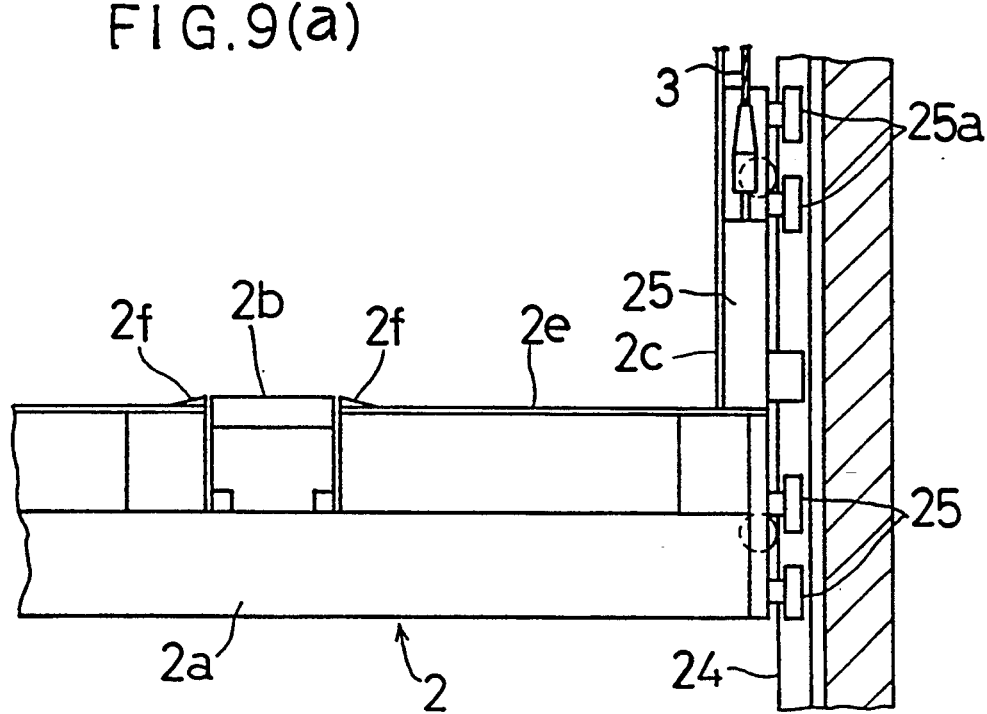
Figure 9B:
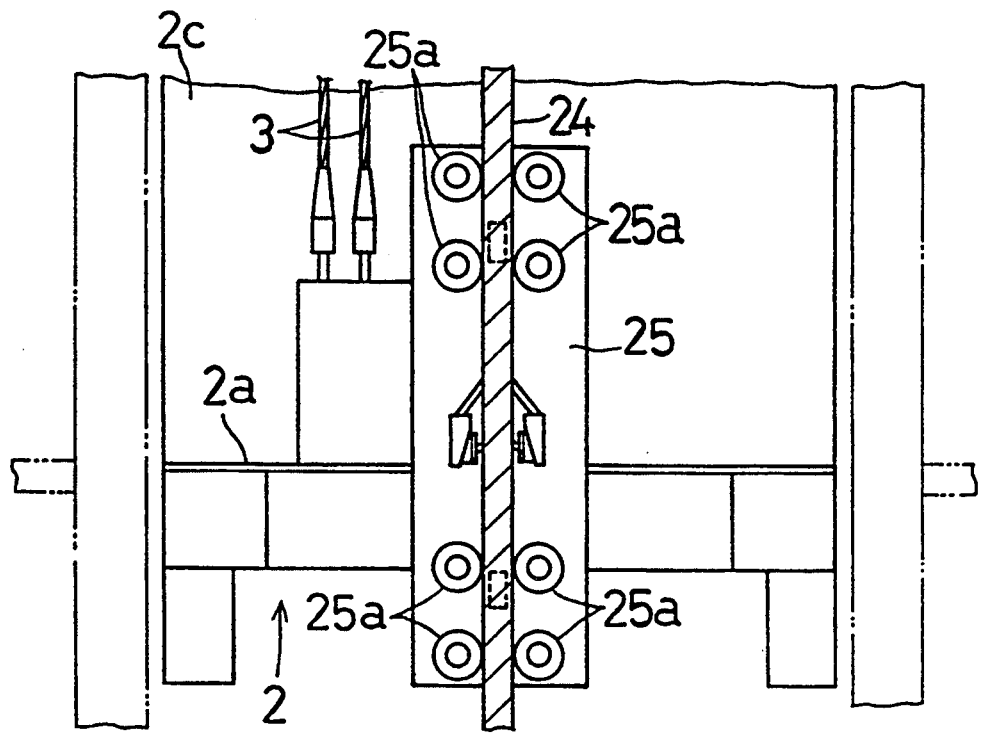

As illustrated in FIGS. 9(a) and (b), the side frame 25 has at least two vertical positions thereof supported by two pairs of rollers 25a so that the lifting movement of the lift table 2 may be guided along the lift passage S and also that the lift table 2 may be supported without inclination due to a shift of its gravity center when the expandable forms 2b are expanded to translate the pallet P.

Figure 7:
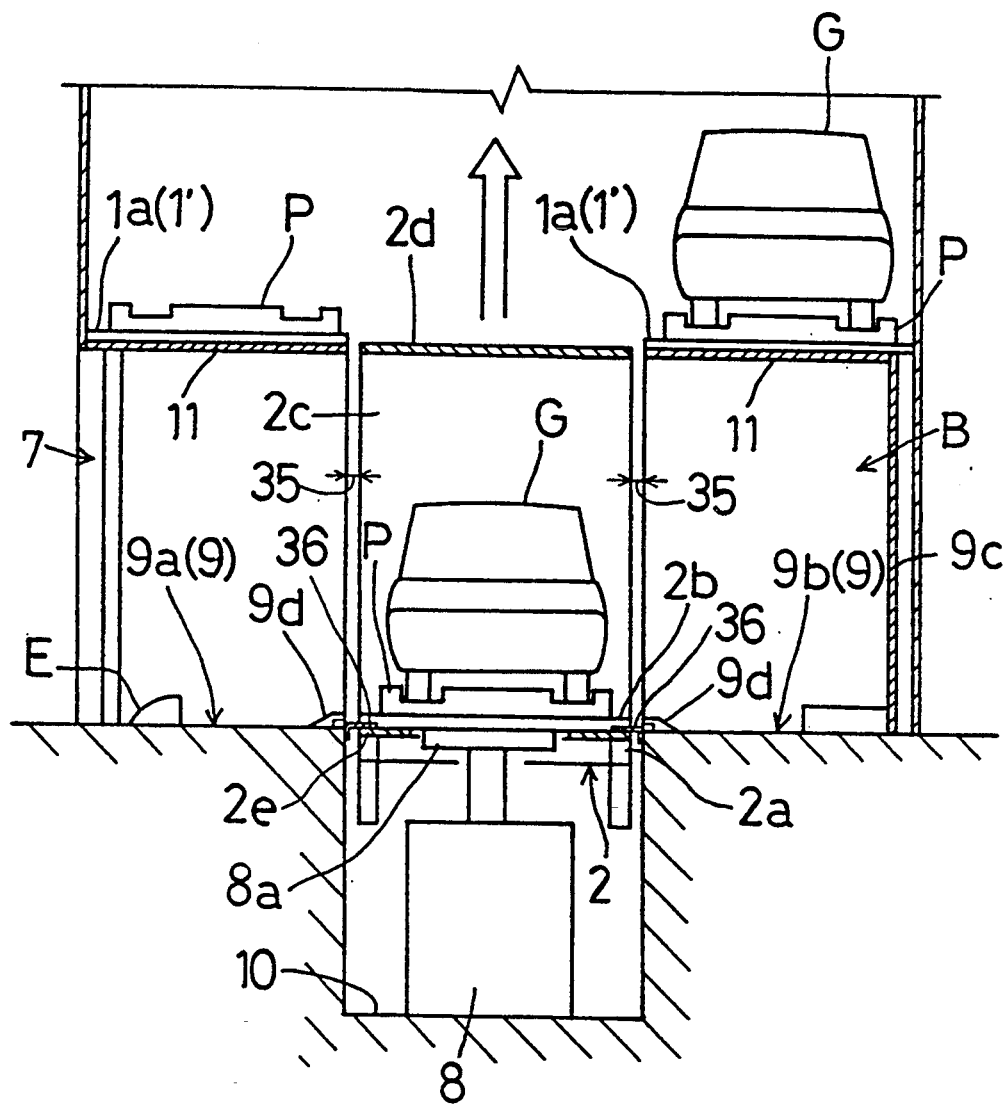
FIG. 7 is a side view showing an entrance/exit section of an automated high-raised parking system relating to a still further embodiment of the present invention.

As illustrated in FIG. 7, the shielding member 2d is attached to the lift table 2 in such a manner that this shielding member 2d forms a ceiling together with the auxiliary shielding member 11 provided on the lower face of the rack 1' positioned immediately above the entrance/exit section B when the lift table 2 is stopped at the position in the entrance/exit section B where the walk-on face 2e of the lift table 2 and the floor face 9 of the entrance/exit section B are positioned on the same height as each other.

The lift drive mechanism D, as illustrated in FIG. 8, includes two cable members 3, 3 to which the lift table 2 and the balance weights 4, 4 are connected, with the cable members 3, 3 being reeved around the suspension pulleys 5a, 5b, 5c and 5d and the drive pulleys 3, 3 of the drive unit 6.

Accordingly, the lift table 2 as being supported and suspended by the cable members 3, 3 and lifted up and down by activation of the drive unit 6.

As shown in FIGS. 1 and 7, the entrance/exit section B includes a pit 10 within which the lift table 2 is positioned for entrance or exit of the automobile G and which is formed continuous with a lower end of the lift passage S. Also, inside this pit 10, there is provided the turntable device 8 having a turntable 8a capable of both swiveling and elevating movements.

In the condition of FIG. 1, the pallet P has its longitudinal axis directed to the inside direction of the parking system and is supported on the pallet-mounting portions 9a, 9b formed by the portions of the floor face 9. This is the afore-mentioned orientation of the pallet for allowing entrance and exit of the driver. On the other hand, in the further condition of FIG. 7, the pallet P has its longitudinal axis directed along the width of the parking system and is mounted on the lift table 2. This is the pallet orientation for lifting operation.

In the condition of FIG. 1, the turntable device 8 lifts the turntable 8a upwards to move the pallet P up away from the pellet-mounting portions 9a, 9b and swivel the pallet P by 90 degrees. Then, as illustrated in FIG. 7, the turntable 8a is lowered to place the pallet P onto the upper faces of the expandable forks 2b of the lift table 2. The turntable device 8 can effect the reverse operations as well.

Figure 10:
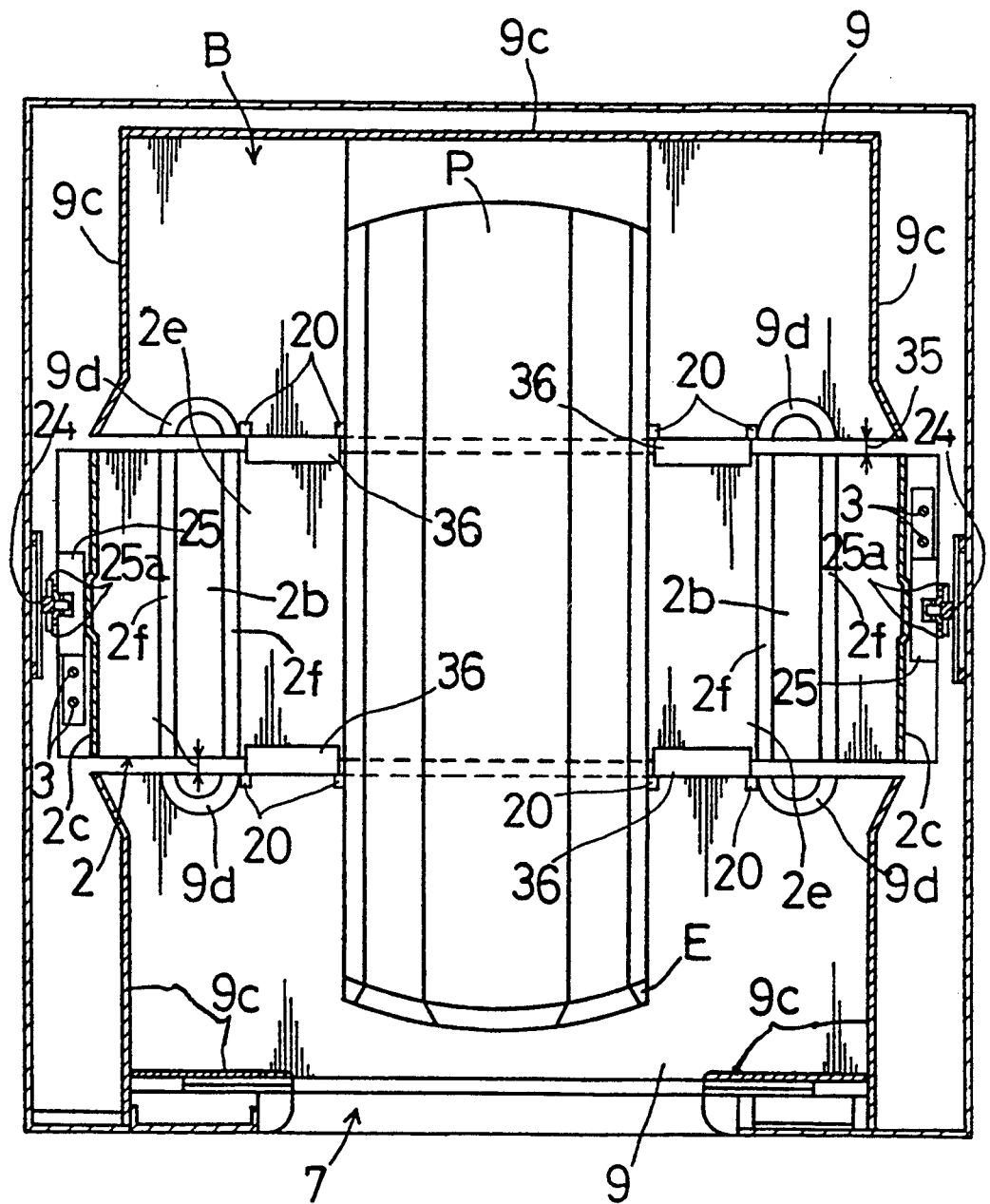
FIG. 10 is a plane view showing the entrance/exit section of the embodiment of FIG. 7, and FIGS. 11(a) and (b) are side views showing constructions of a connection member of the embodiment of FIG. 7.

FIG. 10 shows the inside of the entrance/exit section B when the lift table 2 is located inside the entrance/exit section B.

The pallet P as oriented for entrance and exit is placed at the substantially center area of the entrance/exit section B.

The walk-on face 2e is attached to the portion of the lift table 2 projecting from the pallet P. The lift table 2 is maintained still at the position where the walk-on face 2e is placed at the substantially same height as the floor face 9, so that the walk-on face 2e and the floor face 9 together form a passage face used when the driver gets into or out of the automobile G mounted on the pallet P.

As a gap, i.e. height difference is formed between the upper face of the pallet P and the floor face 9, there is provided a guide member E having an inclined face for guiding the automobile tires. Further, as a gap is also formed between the upper faces of the expandable forks 2b of the lift table 2 and the walk-on face 2e or the floor face 9, there are provided tripping-prevention members 2f, 9d each having an inclined face for preventing tripping of the driver on the walk-on face 2e and the floor face 9, respectively.

To an inner face of the entrance/exit section B, there is attached an inner plate 9c, and at the widthwise opposed sides of the section the inner plate 9c and the side plates 3c are combined to form a single wall member.

Between the lift table 2 and the floor face 9, there is provided a gap 35 for allowing clearance for the lifting movement of the lift table 2.

Between the floor face 9 adjacent the side of the pallet P and the walk-on face 9, there is provided a connecting member 36 for continuously connecting the floor face 9 and the walk-on face 2e.

As shown in FIG. 11, the connecting member 36 includes a gap-bridging plate 36a closing the gap 35 between the floor face 9 and the walk-on face 2e, a dog-receiver plate 36b extending from and normal to the gap-bridging plate 36a under the opened state to form an 'L'-shaped connection and a side plate 36c attached to an end face of the 'L'-shaped connection. An outer face of the 'L'-shaped connection is screwed to an end of the floor face 9 by means of a nut 37. Incidentally, the gap-bridging plate 36a acts also as a dog-receiver under the closed state.

To the side plate 36c, there is attached an end 18a of a spring 18. The other end 18b of this spring 18 is attached to the floor face at a position lower than the floor face and farther from the connecting member 36 than the nut 37. Accordingly, the connecting member 36 is urged by the spring 18 to either the opened state or the closed state across a neutral position where the two ends 18a, 18b and the nut 37 are aligned along a single straight line.

A dog 19 is attached to a side face of the lift table 2.

FIG. 11(a) shows the closed state of the connecting member 36, in which the walk-on face 2e of the lift table 2 and the floor face 9 are located at the same height and one terminal end of the gap-bridging plate 36a extends over the walk-on face 2e. In this condition, when the lift table 2 is lifted upwards, the gap-bridging plate 36a is sprung upwards by the walk-on face 2e and the dog 19 and the connecting member 36 is urged to the opened state beyond the neutral position where the two ends 18a, 18b and the nut 37 are aligned along the single straight line.

FIG. 11(b) shows the opened state of the connecting member 36, where the connecting member 36 urged to the opened state has its gap-bridging plate 36a supported at a vertically upward position by means of a stopper 20. In this condition, when the lift table 2 is moved downwards, the dog-receiver plate 36b is pushed downwards by the dog and the connecting member 36 is urged to the closed state.

As a result, the connecting member 36 is operated to the closed state with the lowering movement of the lift table 2 into the entrance/exit section B and the connecting member 36 is operated to the opened state with the upward movement of the lift table 2 from the entrance/exit section B.

Next, entrance and exit operations of the automobile G to and from the above-described automated high-raised parking system of this embodiment will be described.

FIG. 10 illustrates the inside condition of the entrance/exit section B ready for an automobile entrance, in which condition the entrance-exit opening 7 is opened and the connecting member 36 is maintained at the closed state.

After any other passengers than the driver gets out of the automobile G, the driver drives the automobile G through the entrance-exit opening 7 into the entrance/exit section B and further drives straight onto the pallet P. Then, the driver gets out of the automobile G and walks out of the entrance/exit section B through the entrance-exit opening 7 by using as the passage the walk-on face 2e, the connecting member 36 and the floor face 9.

Thereafter, the turntable device 8 elevates the turntable 8a upwards to move the pallet P up away fro the pallet-mounting portions 9a, 9b of the floor face 9 and then swivels this turntable 8a by 90 degrees. Then, the turntable 8a is lowered to place the pallet P onto the upper faces of the expandable forks 2b of the lift table 2.

Then, the lift table 2 is moved upwards in the lift passage S to make a stop beside a predetermined rack 1, when the connecting member 36 is sprung up by the dog 19 to be switched over to the opened state.

The lift table 2 stopped beside the predetermined rack 1 expands the forks 2b to bring the pallet P into the rack 1, and as the lift table 2 is lowered, the pallet P is translated onto the receiver plate 1a of the rack 1. Thereafter, the forks 2b are withdrawn to complete the entrance operation of the automobile G.

Next, an exit operation of the automobile G will be described.

First, the lift table is moved to the side of the rack 1 where the object automobile is parked and the pallet P is translated onto this lift table 2 by the steps in the reverse sequence to those described in the above entrance operation. Then, the lift table 2 is lowered in the lift passage S into the entrance/exit section B and is stopped at the position where the walk-on face 2e of the lift table 2 and the floor face 9 of the entrance/exit section B are located at the same height, when the connecting member 36 is pressed downwards by the dog 19 to be switched over to the closed state.

Then, the turntable device 8 elevates the turntable 8a to move the pallet P up away from the upper faces of the expandable forks 2b of the lift table and then swivels the pallet P on the turntable by 90 degrees so that the pallet P assumes the reverse orientation to that for the entrance operation. That is to say, the pallet P is oriented so that the forward end of the automobile G is directed towards the entrance-exit opening 7. Then, the turntable 8a is lowered to place the pallet P onto the pallet-mounting portions 9a, 9b.

Next, by using the floor face 9, the connecting member 36 and the walk-on face 2e as the passage, the driver enters the entrance-exit opening 7 and gets into the automobile G. Then, the driver drives the automobile G through the opening 7 out of the parking system. This completes the exit operation of the automobile G.

Incidentally, after the completion of the exit operation, the entrance/exit section B is at the same condition thereof ready for the entrance operation. Accordingly, the entrance operation and the exit operation may be effected continuously.

In case only the entrance operation is repeatedly carried out, like the entrance operation, a pallet P of the rack 1 where no automobile is parked yet is transported to the entrance/exit section B. Whereas, in case only the exit operation is repeatedly carried out, like the exit operation, the pallet P alone is transported to the predetermined rack 1.

In the foregoing embodiment, the connecting member 36 is switched over to the opened state or the closed state in association with the upward or downward movement of the lift table 2. Instead, it is also conceivable to provide an opening/closing drive device and a control device so that the connecting member may be automatically opened and closed depending on lifting information of the lift table.

The specific shape and construction of the gap-bridging plate 36a may be varied depending on the convenience. The connecting member 36 may be so formed as to extend over the entire gap 35. Further, the shapes, constructions and attaching positions of the dog 19 and the dog-receiver plate 36b may be varied depending on the convenience.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which become within the meaning and range of equivalency of the claims are therefore intended to be embraced therein.

What is claimed is:

1. An automated high-raised parking system for parking automobiles comprising:
    a parking rack structure including a plurality of racks disposed one above another for parking an automobile, wherein each said rack includes a receiver frame for receiving ends of a pallet for mounting the automobile;
    an entrance/exit section for allowing entrance and exit of the automobile;
    a lift-translator device for transporting the automobile between said entrance/exit section to said racks, said lift-translator device including a lift table vertically movable along a lift passage extending along a side of said parking rack structure and communicating with said entrance/exit section;
    a shielding means for shielding an upward view through said lift passage from said entrance/exit section when said lift table is positioned at said entrance/exit section for entrance or exit of the automobile, wherein said shielding means includes at least one shielding member disposed at a position above said entrance/exit section, said shielding member being capable of selectively moving between a closed state wherein said shielding member projects into said lift passage to prevent said upward view and an open state wherein said shielding member is withdrawn from said lift passage to allow passage of said lift table through said lift passage, said shielding means further including an opening-closure control means for selectively moving said shielding member between said opened state and said closed state in accordance with a lifting movement of said table; and
    an auxiliary shielding member fixedly attached to a rear face of one of said parking racks which is positioned immediately above said entrance/exit section so as to shield said upward view from said entrance/exit section to said parking rack structure.

2. An automated high-raised parking system as defined in claim 1, wherein said lift-translator device includes said lift table disposed at least over an upper position of said entrance/exit section so as to mount said pallet and a lift drive mechanism for moving said lift table vertically.

3. An automated high-raised parking system as defined in claim 2, wherein said lift drive mechanism includes a plurality of cable members to which said lift table and balance weights are connected, with said cable members being reeved around suspension pulleys and drive pulleys of a drive unit.

4. An automated high-raised parking system as defined in claim 1, wherein said pallet capable of mounting the automobile is constructed so as to be disposed and supported on a floor face of said entrance/exit section and on said floor face there is provided a tire guide member extending continuously with a tire passage of said pallet mounted and supported on said floor face, an end of an upper face of said tire guide member which end being positioned adjacent said pallet has a height substantially equal to a height of an upper face of said tire passage, and said end of said upper face of said tire guide member being provided with such an inclination that said end gradually approaches said floor face in a direction extending away from said pallet.

5. An automated high-raised parking system as defined in claim 4, wherein said pallet includes, at an inner position of said tire passage thereof, an inner derailment-prevention guide projecting upwards relative to said tire passage, while said floor face includes an inner derailment-prevention member extending continuously with said inner derailment-prevention guide of said pallet when placed on said floor face, an end of an upper face of said inner derailment-prevention member which end is positioned adjacent said pallet being provided with a height substantially equal to a height of an upper face of said inner derailment-prevention guide, and said end of said upper face of said inner derailment-prevention member being provided with such an inclination that said end gradually approaches said floor face in a direction extending away from said pallet.

6. An automated high-raised parking system as defined in claim 4, wherein said pallet includes, at opposed lateral sides thereof, a pair of outer derailment-prevention guides projecting upwards relative to said tire passage, while said floor face includes a pair of outer derailment-prevention members extending continuously with said outer derailment-prevention guides of said pallet when said pallet is placed on said floor face, an end of an upper face os each said outer derailment-prevention member which end is positioned adjacent said pallet being provided with a height substantially equal to a height of said upper face of said tire passage, and said end of said upper face of said outer derailment-prevention member being provided with such an inclination that said end gradually approaches said floor face in a direction extending away from said pallet.

7. An automated high-raised parking system as defined in claim 11, wherein said pallet includes, at an inner position of said tire passage thereof, an inner derailment-prevention guide projecting upwards relative to said tire passage, while said floor face includes an inner derailment-prevention member extending continuously with said inner derailment-prevention guide of said pallet when placed on said floor face, an end of an upper face of said inner derailment-prevention member which end is positioned adjacent said pallet being provided with a height substantially equal to a height of an upper face of said inner derailment-prevention guide, and said end of said upper face of said inner derailment-prevention member being provided with such an inclination that said end gradually approaches said floor face in a direction extending away from said pallet.

8. An automated high-raised parking system as defined in claim 6, wherein a side face of said outer derailment-prevention member opposing to said tire guide member has its end adjacent said pallet formed at a substantially same position as an inner side face of said outer derailment-prevention guide with respect to a width direction of said pallet, and said side face of said outer derailment-prevention member is formed so as to extend outwards relative to said pallet width direction departing from said pallet.

9. An automated high-raised parking system as defined in claim 8, wherein said pallet includes, at an inner position of said tire passage thereof, an inner derailment-prevention guide projecting upwards relative to said tire passage, while said floor face includes an inner derailment-prevention member extending continuously with said inner derailment-prevention guide of said pallet when placed on said floor face, an end of an upper face of said inner derailment-prevention member which end is positioned adjacent said pallet being provided with a height substantially equal to a height of an upper face of said inner derailment-prevention guide, and said end of said upper face of said inner derailment-prevention member being provided with such an inclination that said end gradually approaches said floor face in a direction extending away from said pallet.

10. An automated high-raised parking system as defined in claim 9, wherein a side face of said inner derailment-prevention member opposing to said tire guide member has its end adjacent said pallet formed at a substantially same position as an outer side face of said inner derailment-prevention guide with respect to a width direction of said pallet, and said side face of said inner derailment-prevention member is formed so as to extend outwards relative to said pallet width direction departing from said pallet.

11. An automated high-raised parking system as defined in claim 1, wherein at said entrance/exit section there is provided a turntable device for receiving and supporting said pallet lowered by said lift table and mounting the automobile thereon and for swiveling said pallet between a position for orienting the automobile for an entrance or exit and a further position for orienting the automobile for a lifting by said lift table.

12. An automated high-raised parking system as defined in claim 11, wherein said lift table includes a walk-on face at a position of said lift table projecting from said pallet, said floor face of the entrance/exit section and said walk-on face of the lift table being located at a substantially same height as each other when said lift table is located at said entrance/exit section.

13. An automated high-raised parking system as defined in claim 12, wherein a connection member is provided for continuously connecting said floor face and said walk-on surface, said connection member being capable of selectively providing a closed state for connecting said floor face and said walk-on surface and an opened state where said connection member is receded towards either said floor face side or said walk-on surface side.

14. An automated high-raised parking system as defined in claim 13, wherein said connection member is automatically switched to said closed state when said lift table is lowered into said entrance/exit section and that said connection member is automatically switched to said open state when said lift table is moved outwards from said entrance/exit section.

15. An automated high-raised parking system comprising:
   a parking rack structure including a plurality of racks disposed one above another for parking an automobile, wherein each said rack includes a receiver frame for receiving ends of a pallet for mounting the automobile;
   an entrance/exit section for allowing entrance and exit of the automobile;
   a life-translator device for transporting the automobile between said entrance/exit section to said racks, said lift-translator device including a lift table vertically movable along a lift passage extending along a side of said parking rack structure and communicating with said entrance/exit section;
   a shielding means for shielding an upward view through said lift passage from said entrance/exit section when said lift table is positioned at said entrance/exit section for entrance or exit of the automobile, wherein said shielding means includes a shielding member liftable with said lift table; and
   an auxiliary shielding member fixedly attached to a rear face of one of said parking racks which is positioned immediately above said entrance/exit section so as to shield said upward view from said entrance/exit section to said parking rack structure;
   wherein said pallet which is capable of mounting the automobile is constructed so as to be disposed and supported on a floor face of said entrance/exit section, and a tire guide member is provided on said floor face extending continuously with a tire passage of said pallet which is mounted and supported on said floor face, an end of an upper face of said tire guide member which end being positioned adjacent said pallet has a height substantially equal to a height of an upper face of said tire passage, and said end of said upper face of said tire guide member being provided with such an inclination that said end gradually approaches said floor in a direction extending away from said pallet.

16. An automated high-raised parking system as defined in claim 15, wherein said pallet includes, at an inner position of said tire passage thereof, an inner derailment-prevention guide projecting relative to said tire passage, while said floor face includes an inner derailment-prevention member extending continuously with said inner derailment-prevention guide of said pallet when placed on said floor face, an end of an upper face of said inner derailment-prevention member which end is positioned adjacent said pallet being provided with a height substantially equal to a height of an upper face of said inner derailment-prevention guide, and said end of said upper face of said inner derailment-prevention member being provided with such an inclination that said end gradually approaches said floor face in a direction extending away from said pallet.

17. An automated high-raised parking system as defined in claim 16, wherein said pallet includes, at opposed lateral sides thereof, a pair of outer derailment-prevention guides projecting upwards relative to tire passage, while said floor face includes a pair of outer derailment-prevention members extending continuously with said outer derailment-prevention guides of said pallet, an end of an upper face of each said outer derailment-prevention member which end is positioned adjacent said pallet being provided with a height substantially equal to a height of said upper face of said tire passage, and said end of said upper face of said outer derailment-prevention member being provided with such an inclination that said end gradually approaches said floor face in a direction extending away from said pallet.

* * * * *

UNITED STATES PATENT AND TRADEMARK OFFICE
CERTIFICATE OF CORRECTION

PATENT NO. : 5,333,987
DATED : August 2, 1994
INVENTOR(S): Shigekazu Takaoka

It is certified that error appears in the above-indentified patent and that said Letters Patent is hereby corrected as shown below:

Column 1 Line 15 "exist" should read --exit--.

Column 2 Line 34 "have" should read --has--.

Column 3 Line 11 after "substantially" insert --the--.

Column 4 Line 57 "characteristic" should read --characteristics--.

Column 7 Line 44 "lifting" should read --lift--.

Column 8 Line 13 "drive" should read --driver--.

Column 8 Line 56 "of" should read --to--.

Column 8 Line 66 after "substantially" insert --the--.

Column 9 Lines 20-21 "patters" should read --patterns--.

Column 9 Line 49 "the the" should read --the--.

Column 9 Line 51 "fames" should read --frames--.

Column 10 Line 40 "pellet-mounting" should read --pallet-mounting--.

Column 12 Line 9 "fro" should read --from--.

UNITED STATES PATENT AND TRADEMARK OFFICE
CERTIFICATE OF CORRECTION

PATENT NO. : 5,333,987           Page 2 of 2

DATED      : August 2, 1994

INVENTOR(S): Shigekazu Takaoka

It is certified that error appears in the above-indentified patent and that said Letters Patent is hereby corrected as shown below:

Claim 6 Line 45 Column 14 "os" should read --of--.

Claim 7 Line 54 Column 14 "11" should read --6--.

Claim 15 Line 6 Column 16 "life-translator" should read --lift-translator--.

Claim 16 Line 40 Column 16 after "projecting" insert --upwards--.

Signed and Sealed this

Twenty-fifth Day of October, 1994

Attest:

BRUCE LEHMAN

Attesting Officer    Commissioner of Patents and Trademarks